(12) United States Patent
Walters et al.

(10) Patent No.: US 11,461,403 B2
(45) Date of Patent: *Oct. 4, 2022

(54) SYSTEMS AND METHODS FOR IDENTIFYING ORDERED SEQUENCE DATA

(71) Applicant: Capital One Services, LLC, McLean, VA (US)

(72) Inventors: Austin Walters, Savoy, IL (US); Jeremy Goodsitt, Champaign, IL (US); Mark Watson, Sedona, AZ (US); Anh Truong, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 104 days.

This patent is subject to a terminal disclaimer.

(21) Appl. No.: 16/920,870

(22) Filed: Jul. 6, 2020

(65) Prior Publication Data

US 2021/0056143 A1 Feb. 25, 2021

Related U.S. Application Data

(63) Continuation of application No. 16/549,579, filed on Aug. 23, 2019, now Pat. No. 10,740,403.

(51) Int. Cl.
*G06F 16/903* (2019.01)
*G06F 16/22* (2019.01)
*G06F 16/901* (2019.01)
*G06N 20/00* (2019.01)

(52) U.S. Cl.
CPC ...... *G06F 16/90348* (2019.01); *G06F 16/221* (2019.01); *G06F 16/901* (2019.01); *G06N 20/00* (2019.01)

(58) Field of Classification Search
CPC .. G06F 16/221; G06F 16/2465; G06F 16/901; G06F 16/90348; G06N 20/00; G06N 3/084
See application file for complete search history.

(56) References Cited

U.S. PATENT DOCUMENTS

| | | | |
|---|---|---|---|
| 8,438,472 B2 | 5/2013 | Mansfield et al. | |
| 9,336,494 B1 | 5/2016 | Purpura et al. | |
| 10,417,195 B2 | 9/2019 | Sasaki et al. | |
| 10,885,590 B2* | 1/2021 | Sivakumar | G06Q 40/08 |
| 11,238,576 B2* | 2/2022 | Miki | G06N 20/00 |
| 2012/0288036 A1 | 11/2012 | Panigrahy et al. | |

(Continued)

*Primary Examiner* — Richard L Bowen
(74) *Attorney, Agent, or Firm* — Finnegan, Henderson, Farabow, Garrett & Dunner, LLP (57) ABSTRACT

A system includes one or more processors configured to execute the instructions to perform a method for determining the ordered sequence. In the method, a dataset is retrieved from a database. The dataset comprises a data matrix comprising a plurality of elements or cells arranged in a set of rows and columns. The dataset is partitioned into a plurality of frames comprising a first subset of the set of rows and columns, the plurality of frames being in a sequential order. A machine learning algorithm to the dataset to predict contents of a next frame in the sequential order. Comparing the predicted contents of the next frame with actual contents of the next frame to determine a prediction accuracy value, and if the prediction accuracy value of the predicted contents exceeds a first threshold level, storing the predicted contents of the next frame.

20 Claims, 11 Drawing Sheets

(56) References Cited

U.S. PATENT DOCUMENTS

| | | |
|---|---|---|
| 2018/0088753 A1 | 3/2018 | Viégas et al. |
| 2018/0144264 A1 | 5/2018 | Ranzato et al. |
| 2018/0330729 A1* | 11/2018 | Golipour .................. G10L 15/26 |
| 2018/0349377 A1* | 12/2018 | Verma .................... G06N 5/022 |
| 2019/0050726 A1 | 2/2019 | Azaria et al. |

* cited by examiner

| Table 1 | | | |
|---|---|---|---|
| | Column 1 | Column 2 | Column 3 |
| | Customer number | Income/year | Age (years) |
| Row 1 | Customer 1 | $25,000 | 24 |
| Row 2 | Customer 2 | $35,000 | 25 |
| Row 3 | Customer 3 | $55,000 | 26 |
| Row 4 | Customer 4 | $65,000 | 30 |
| Row 5 | Customer 5 | $75,000 | 31 |
| Row 6 | Customer 6 | $85,000 | 32 |
| Row 7 | Customer 7 | $95,000 | 36 |
| Row 8 | Customer 8 | $105,000 | 37 |
| Row 9 | Customer 9 | $125,000 | 38 |

FIG. 5A

| Table 1 | | | |
|---|---|---|---|
| | Column 1 | Column 2 | Column 3 | |
| | Customer number | Income/year | Age (years) | Frame Number |
| Row 1 | Customer 1 | $25,000 | 24 | Frame 1 |
| Row 2 | Customer 2 | $35,000 | 25 | |
| Row 3 | Customer 3 | $55,000 | 26 | |
| Row 4 | Customer 4 | $65,000 | 30 | Frame 2 |
| Row 5 | Customer 5 | $75,000 | 31 | |
| Row 6 | Customer 6 | $85,000 | 32 | |
| Row 7 | Customer 7 | $95,000 | 36 | Frame 3 |
| Row 8 | Customer 8 | $105,000 | 37 | |
| Row 9 | Customer 9 | $125,000 | 38 | |

FIG. 5B

| Original Frame 1 | | | |
|---|---|---|---|
| Row 1 | Customer 1 | $25,000 | 24 |
| Row 2 | Customer 2 | $35,000 | 25 |
| Row 3 | Customer 3 | $55,000 | 26 |

FIG. 5C

| Predicted Frame 2 | | | |
|---|---|---|---|
| Row 4 | Customer 4 | $65,000 | 27 |
| Row 5 | Customer 5 | $75,000 | 28 |
| Row 6 | Customer 6 | $95,000 | 29 |

FIG. 5D

| Original Frame 2 | | | |
|---|---|---|---|
| Row 4 | Customer 4 | $65,000 | 30 |
| Row 5 | Customer 5 | $75,000 | 31 |
| Row 6 | Customer 6 | $85,000 | 32 |

| Predicted Frame 2 | | | |
|---|---|---|---|
| Row 4 | Customer 4 | $65,000 | 27 |
| Row 5 | Customer 5 | $75,000 | 28 |
| Row 6 | Customer 6 | $95,000 | 29 |

FIG. 5E

| Original Frame 2 | | | |
|---|---|---|---|
| Row 4 | Customer 4 | $65,000 | 30 |
| Row 5 | Customer 5 | $75,000 | 31 |
| Row 6 | Customer 6 | $85,000 | 32 |

FIG. 5F

| Predicted Frame 3 | | | |
|---|---|---|---|
| Row 7 | Customer 7 | $95,000 | 36 |
| Row 8 | Customer 8 | $105,000 | 37 |
| Row 9 | Customer 9 | $125,000 | 38 |

FIG. 5G

| Original Frame 3 | | | |
|---|---|---|---|
| Row 7 | Customer 7 | $95,000 | 36 |
| Row 8 | Customer 8 | $105,000 | 37 |
| Row 9 | Customer 9 | $125,000 | 38 |

---------  ----------  ----------  --------  -------    --------    -------  --------

| Predicted Frame 3 | | | |
|---|---|---|---|
| Row 7 | Customer 7 | $95,000 | 36 |
| Row 8 | Customer 8 | $105,000 | 37 |
| Row 9 | Customer 9 | $125,000 | 38 |

FIG. 5H

SYSTEMS AND METHODS FOR IDENTIFYING ORDERED SEQUENCE DATA

CROSS-REFERENCE TO RELATED APPLICATIONS

This application is a continuation of U.S. patent application Ser. No. 16/549,579, filed on Aug. 23, 2019, currently pending, the disclosure of which is expressly incorporated herein by reference in its entirety.

TECHNICAL FIELD

Embodiments of the present disclosure relate to systems and methods for identifying ordered sequence data in a dataset. More particularly, embodiments of the present disclosure relate to utilizing a machine learning algorithm to predict whether a dataset includes sequenced data.

BACKGROUND

Machine learning models often require large datasets (e.g., many hundreds or thousands of entries) to train machine learning models for a specific application. The content of such datasets may include data in different orders and/or sequences (e.g., ascending order, descending order, numerical series, etc.). These datasets may be sampled randomly and provided as input to the machine learning models. In addition, the sampled data may be shuffled before being input to the machine learning models. This random sampling and shuffling suppresses the original sequence of the data, thus making the data less useful as a learning set. At times, a portion of these datasets may include ordered sequence, and to identify this ordered sequence from the datasets is not possible. Consequently, there is a need to automatically identify ordered sequence data in machine learning datasets in order to make more effective and efficient prediction of the content within a dataset.

SUMMARY

In accordance with embodiments of the present disclosure, there is provided a system for determining an ordered sequence of data in a dataset, the system comprising one or more memory devices storing instructions and one or more processors configured to execute the instructions to perform a method for determining the ordered sequence. In the method, a dataset is retrieved from a database. The dataset comprising a data matrix, the data matrix comprising a plurality of elements arranged in a set of rows and columns. Partitioning the dataset into a plurality of frames, each frame of the plurality of frames comprising a first subset of the set of rows and columns, the plurality of frames being in a sequential order. Determining if one of the plurality of frames in the sequential order includes an ordered sequence. Applying a machine learning algorithm to the dataset to predict contents of a next frame in the sequential order. Comparing the predicted contents of the next frame with actual contents of the next frame to determine a prediction accuracy value, and if the prediction accuracy value of the predicted contents exceeds a first threshold level, storing the predicted contents of the next frame.

In accordance with embodiments of the present disclosure, there is also provided a computer implemented method for determining an ordered sequence of data in a dataset. In the method, a dataset is retrieved from a database. The dataset comprising a data matrix, the data matrix comprising a plurality of elements arranged in a set of rows and columns. Partitioning the dataset into a plurality of frames, each frame of the plurality of frames comprising a first subset of the set of rows and columns, the plurality of frames being in a sequential order. Determining if one of the plurality of frames in the sequential order includes an ordered sequence. Applying a machine learning algorithm to the dataset to predict contents of a next frame in the sequential order. Comparing the predicted contents of the next frame with actual contents of the next frame to determine a prediction accuracy value, and if the prediction accuracy value of the predicted contents exceeds a first threshold level, storing the predicted contents of the next frame.

In accordance with embodiments of the present disclosure, there is further provided a non-transitory computer-readable medium storing instructions executable by one or more processors. When executed, the instructions execute a method for determining an ordered sequence of data, by retrieving a dataset from a database. The dataset comprising a data matrix, the data matrix comprising a plurality of elements arranged in a set of rows and columns. Partitioning the dataset into a plurality of frames, each frame of the plurality of frames comprising a first subset of the set of rows and columns, the plurality of frames being in a sequential order. Determining if one of the plurality of frames in the sequential order includes an ordered sequence. Applying a machine learning algorithm to the dataset to predict contents of a next frame in the sequential order. Comparing the predicted contents of the next frame with actual contents of the next frame to determine a prediction accuracy value, and if the prediction accuracy value of the predicted contents exceeds a first threshold level, storing the predicted contents of the next frame.

BRIEF DESCRIPTION OF DRAWINGS

The accompanying drawings, which are incorporated in and constitute a part of his specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
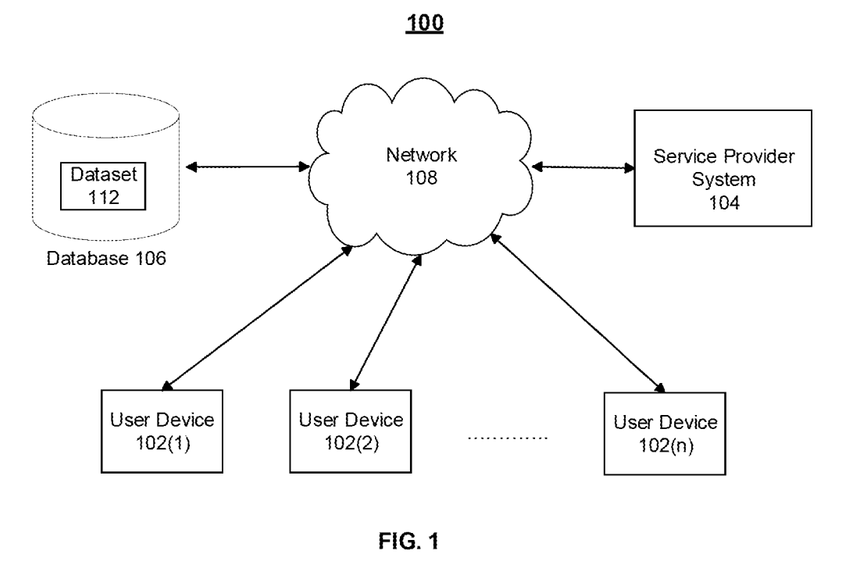
FIG. 1 is a block diagram of an exemplary system for predicting a subsequent frame to identify ordered sequence data, consistent with disclosed embodiments.

FIG. 1 is a block diagram of an exemplary system 100, for performing one or more operations consistent with disclosed embodiments. In some embodiments, system 100 may include one or more user devices 102, one or more service provider systems 104, one or more databases 106, and a network (or networks) 108. However, one skilled in the art will recognize that the components of system 100 and their arrangement may vary. Thus, system 100 may include other components that perform or assist in the performance of one or more operations consistent with the disclosed embodiments.

Figure 2:
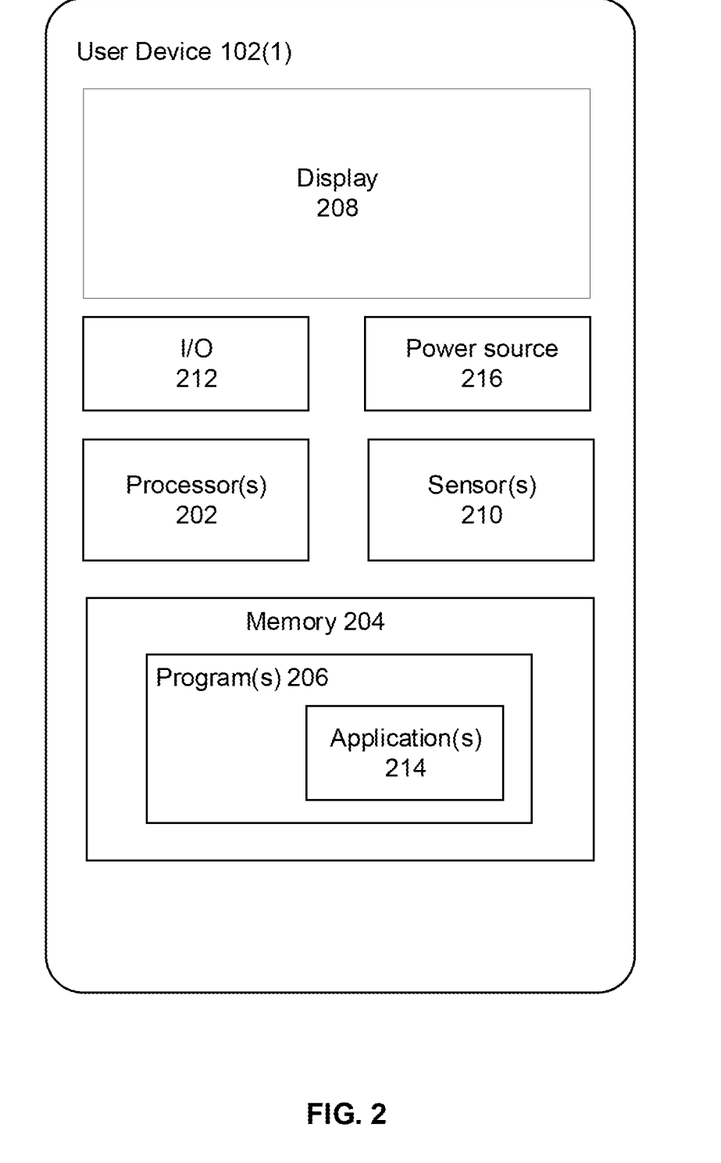
FIG. 2 is a block diagram of an exemplary user device for predicting a subsequent frame to identify ordered sequence data, consistent with disclosed embodiments.

FIG. 2 shows an exemplary configuration of a user device 102(1), consistent with disclosed embodiments. Each of user devices 102(1)-102(n) shown in FIG. 1 may be similarly configured. User device 102(1) may enable an associated user to perform remote interactions or mobile transactions with service provider system 104, for example, or receive information from service provider system 104. User device 102(1) may include one or more computing devices configured to perform operations consistent with the disclosed embodiments. For example, user device 102(1) may be implemented by a personal computing device, such as a smartphone, a laptop or notebook computer, a tablet, a smartwatch, or other device with computing ability, or a combination of such devices and components.

As shown in FIG. 2, user device 102(1) may include one or more processors 202 configured to execute software instructions stored in memory, such as a memory 204. Memory 204 may store one or more software programs 206 that when executed by processor 202 perform communication, content display, and other interactive processes. For example, user device 102(1) may be configured to store, in memory 204, one or more operating systems. By way of example, the operating systems may include Microsoft Windows™, Unix™, Linux™ Android™, Apple™ Mac OS operating systems, iOS, Chrome OS, or other operating system. The operating system may further execute programs 206, such as a browser or related mobile display software, that allows user device 102(1) to communicate with service provider system 104 and other components via network 108 to generate and display interfaces on a display device 208 included in, or in communication with, user device 102(1).

Display device 208 may include, for example, a liquid crystal display (LCD), a light emitting diode screens (LED), an organic light emitting diode screen (OLED), a touch screen, or other display device. Display device 208 may display various information to users. For example, display device 208 may display an interactive interface to user enabling the user to operate user device 102(1) to perform certain aspects of the disclosed methods. Display device 208 may be part of a graphical user interface (GUI) implemented using one or more input/output (I/O) devices 212 that allow user device 102(1) to send and receive information from, provide input to or otherwise interact with other components of system 100.

For example, I/O devices 212 may include various input/output devices, such as a keyboard, mouse, trackball, gesture sensor, action sensor, button, switch, microphone, touch-screen, stylus, etc., that may be manipulated by a user to input information using user device 102(1), e.g., using a graphical user interface (GUI). I/O device 212 may also include an audio output device, such as a speaker.

In some embodiments, programs 206 stored on user device 102(1) may include one or more software applications 214 that enable user device 102(1) to communicate with service provider system 104 via network 108 and perform aspects of the disclosed methods. User devices 102 may also store and execute other applications that allow users to, e.g., access data and/or provide input to system 100. For example, user device 102(1) may connect to service provider system 104 by using browser software to access and receive information or perform other operations associated with an Internet service provider. Further the user device 102(1) includes a power source 216.

Service provider system 104 may include one or more computing devices, configured to perform one or more operations consistent with disclosed embodiments as described more fully below in relation to FIG. 3. In one aspect, service provider system 104 may include one or more servers or server systems having one or more processors configured to execute software instructions stored in a memory or other storage device. In some embodiments, service provider system 104 may provide one or more mobile applications, websites or online portals that are accessible by user devices 102 over network 108.

Database 106 may include one or more memory devices that store information and are accessed and/or managed by one or more components of system 100. By way of example, database 110 may include Oracle™ databases, Sybase™ databases, or other relational databases or nonrelational databases, such as Hadoop sequence files, HBase, or Cassandra. Database 106 may include computing components (e.g., database management system, database server, etc.) configured to receive and process requests for data stored database 106.

Data in database 106 may be organized as a dataset 112. Dataset 112 may include structured data, semi-structured data, and/or unstructured data. Structured data may include data that is organized in a relational database, e.g., a matrix or table including a plurality of rows and columns to represent alphabetical data, numerical data, and/or alphanumerical data. Semi-structured data may include data that is not organized in a relational database, but nevertheless has some organizational properties, such as XML data, float point numbers. Unstructured data is data that is not organized in a pre-defined manner or does not have a pre-defined model, such as uncategorized text.

User device(s) 102, service provider system(s) 104, and database(s) 106 may be configured to communicate via network 108. Network 108 may comprise any type of computer networking arrangement configured to provide communications and/or exchange data between components of system 100. For example, network 108 may include any type of network (including infrastructure) that facilitates the exchange of digital information, such as the Internet, a private data network, a virtual private network using a public network, a LAN or WAN network, a Wi-Fi™ network, and/or other suitable network that may enable information exchange among various components of system 100. Portions of network 108 may be implemented using, e.g., cellular (e.g., 3G, 4G, 5G, etc.), Wi-Fi™, RFID, near-field communication (NFC), and/or BLUETOOTH® technologies, a public switched telephone network ("PSTN"), etc. One of skill in the art will understand that this disclosure is not limited to a particular communications technology and that another suitable uni- or bi-directional communication technologies may be utilized.

In an exemplary embodiment, software applications 214 associated with service provider system 104 may be installed on an exemplary user device 102(1), as shown in FIG. 2. For example, service provider system 104 may store software instructions corresponding to one or more software applications 214 in database 106. Service provider system 104 may receive a request from user device 102(1) to download one or more software applications 214 to user device 102(1). In one embodiment, service provider system 104 may receive the request to download one or more software applications 214 associated with service provider system 104 onto user device 102(1) from a webpage or another portal associated with service provider system 104 accessed by a user via, e.g., user device 102(1). User device 102(1) may receive the software code related to one or more software applications 214 via network 108.

Figure 3:
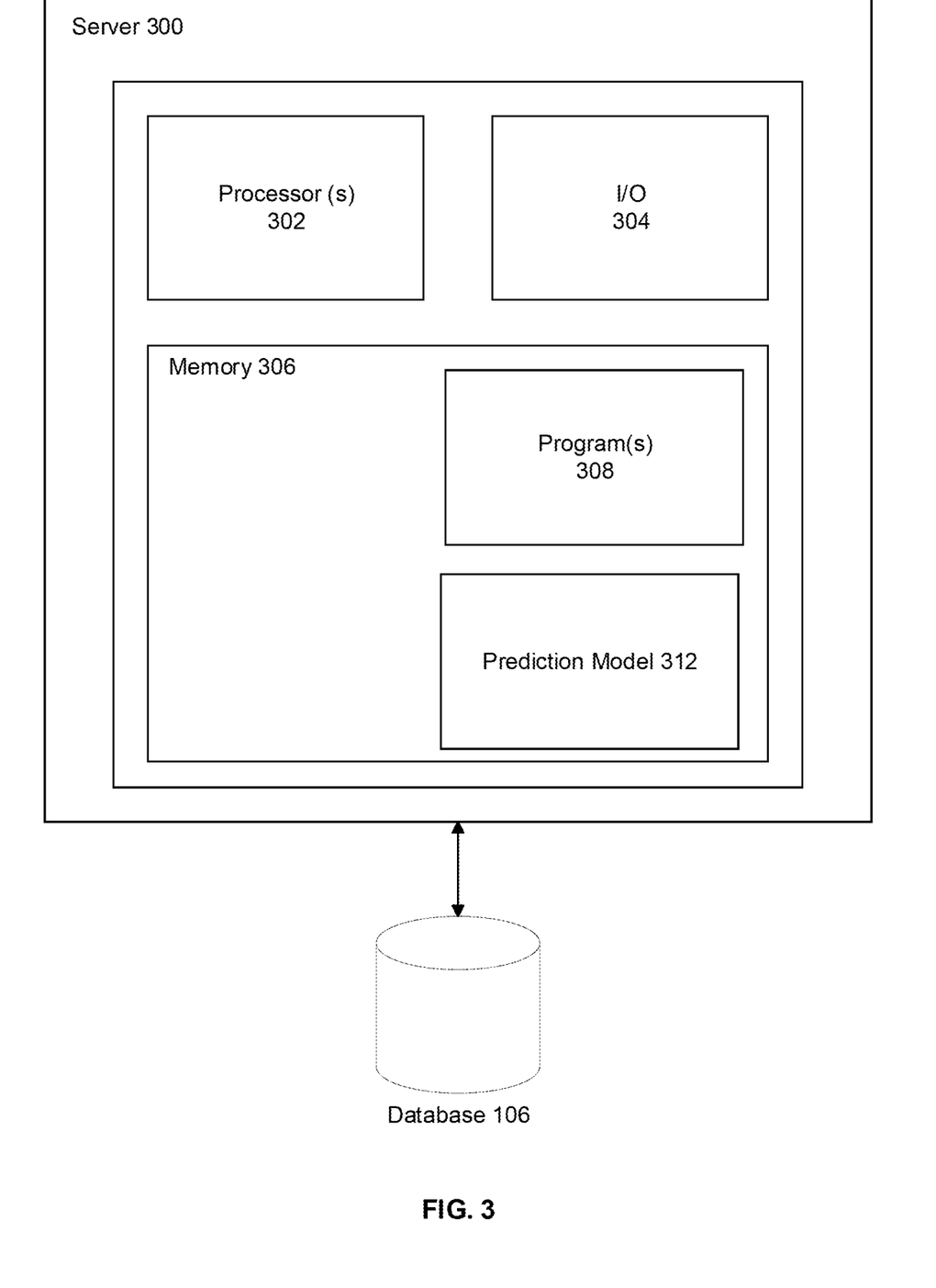
FIG. 3 is a block diagram of an exemplary server system for predicting a subsequent frame to identify ordered sequence data, consistent with disclosed embodiments.

FIG. 3 shows an exemplary server 300 consistent with the disclosed embodiments. Variations of exemplary server 300 may constitute one or more components of service provider system 104. In one embodiment, server 300 may include one or more processors 302, one or more input/output (I/O) devices 304, and one or more memories 306. In some embodiments, server 300 may take the form of a specially programmed server or computing system within service provider system 104. Alternatively, server 300 may be configured as an apparatus, embedded system, dedicated circuit, or the like based on the storage, execution, and/or implementation of software instructions that perform one or more operations consistent with the disclosed embodiments.

Processor 302 may include one or more known processing devices, such as a microprocessor from the Pentium™ or Xeon™ family manufactured by Intel™, or the Turion™ family manufactured by AMD™. However, the disclosed embodiments are not limited to a particular processor and may be implemented by other processors configured to meet the computing demands required the various components of system 100.

Input/output (I/O) device 304 may include various input/output devices, such as a keyboard, mouse, trackball, gesture sensor, action sensor, button, switch, microphone, touchscreen, stylus, etc., that may be manipulated by a user to input information to server 300, e.g., using a graphical user interface (GUI). I/O device 304 may also include an audio output device. I/O devices 304 may include a transceiver or transmitter configured to communicate using one or more wireless technologies/protocols that may include, without limitation, cellular (e.g., 3G, 4G, 5G, etc.), Wi-Fi™, RFID, near-field communication (NFC), or BLUETOOTH® technologies, a public switched telephone network ("PSTN"), etc. One of skill in the art will recognize that other uni- or bi-directional communication technologies may also be used.

Memory 306 may include one or more storage devices configured to store instructions used by processor 302 to perform functions related to disclosed embodiments. For example, memory 306 may be configured with one or more software instructions, such as program(s) 308 that, when executed by processor 302, may perform one or more operations consistent with the disclosed embodiments. These sets of instructions may be executed by processor 302 to perform communication and/or processes consistent with disclosed embodiments.

In particular, memory 306 may include a prediction model 312 that uses a machine learning algorithm to identify an ordered sequence. Prediction model 312 may employ various machine learning algorithms including decision tree learning, association rule learning, artificial neural networks, inductive logic programming, support vector machines, clustering, Bayesian networking, reinforcement learning, representation learning, similarity and metric learning, spare dictionary learning, rule-based machine learning, etc. The machine learning algorithm may be implemented using, e.g., a Recursive Cortical Network (RCN), Long Short-Term Memory (LSTM), Convolutional Neural Network (CNN), Gaussian Process Regression (GPR), etc. One of skill in the art will appreciate that another type of intelligence and machine learning model may be applied.

Figure 4A:
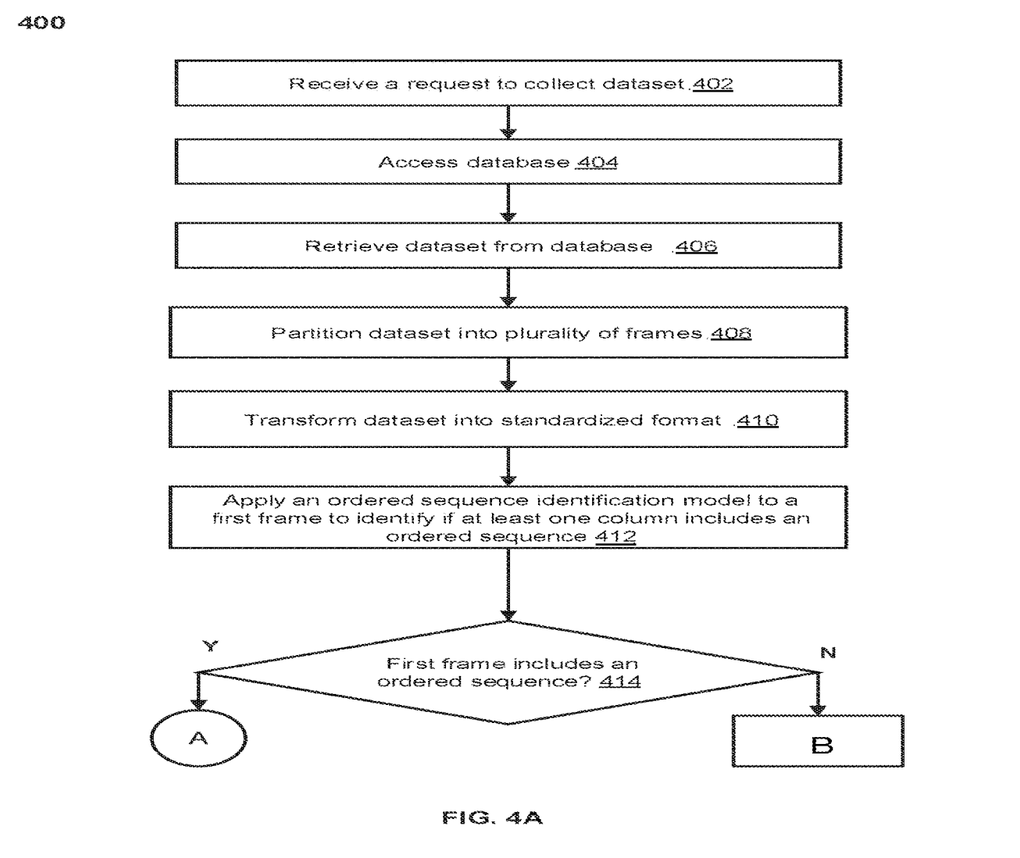
FIGS. 4A, and 4B show a flowchart describing an exemplary process for predicting a subsequent frame to identify ordered sequence data, consistent with disclosed embodiments.
Figure 4B:
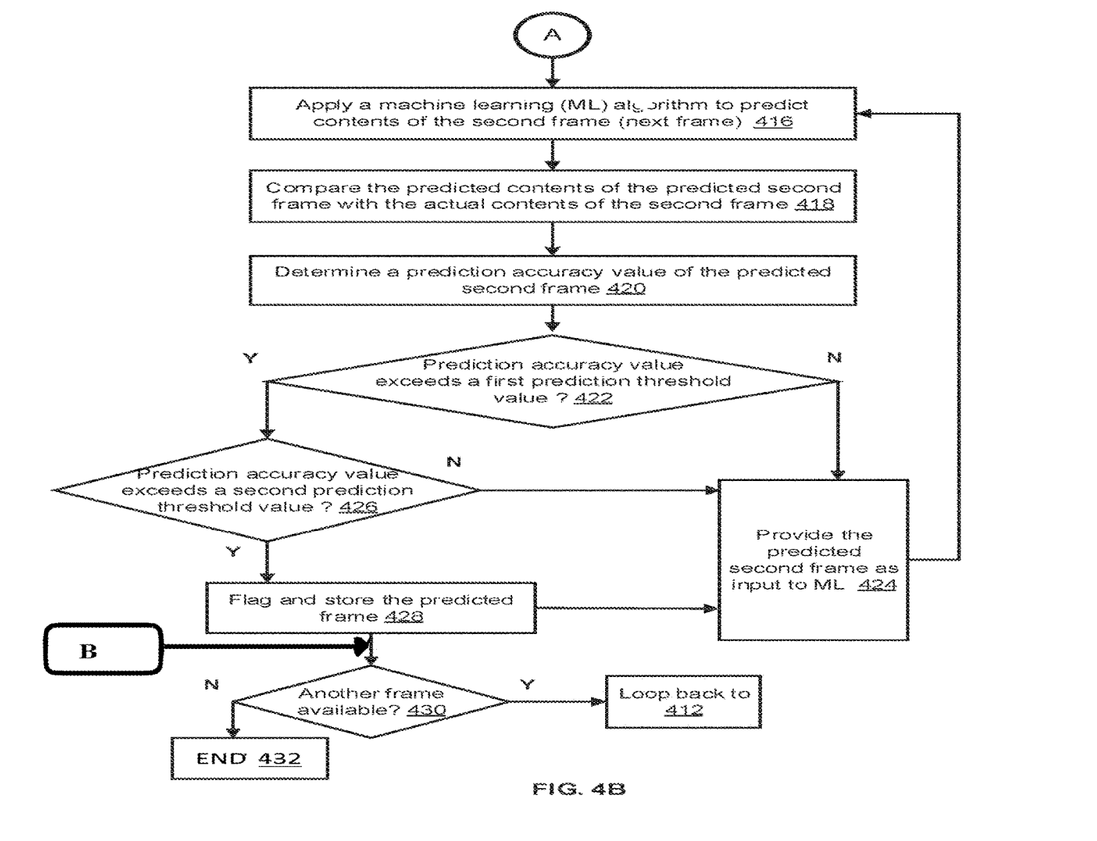

FIGS. 4A-4C show a flowchart of an exemplary process 400 to identify ordered sequence data, consistent with the disclosed embodiments.

In step 402 of process 400, the server 300 receives a request to collect a dataset 112 from database 106. By way of example, the request may be received by server 300 from user device 102(1), e.g., via a browser or other application. Alternatively, the request may be received from I/O device 304 or another server program 308.

In step 404, server 300 accesses database 106 to retrieve the requested dataset 112 from database 106.

In step 406, server 300 retrieves the requested dataset 112 from database 106. By way of example, the contents of retrieved dataset 112 may include a Table 1 which is an exemplary dataset 112 shown in FIG. 5A (discussed below). However, one skilled in the art will recognize that the data in FIG. 5A is exemplary only, and that dataset 112 may include other types of data.

Figure 5A:
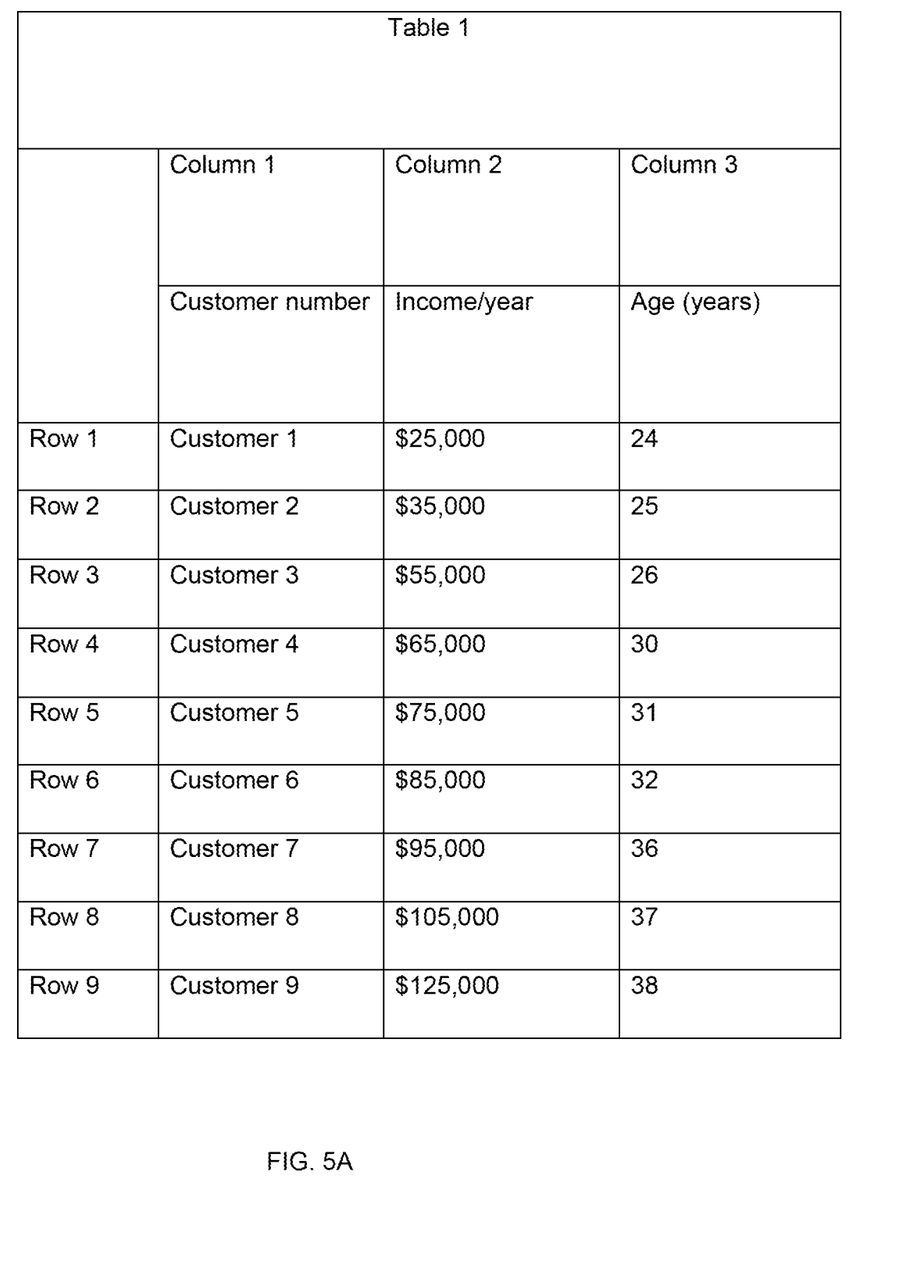
FIGS. 5A-5H shows an exemplary dataset 112 of FIG. 1.

As shown in FIG. 5A, the retrieved dataset 112 may be organized in a matrix or table with contents arranged in a plurality of rows and columns. Table 1 includes column 1 which includes customer numbers, column 2 includes income per year associated with the customer, column 3 includes age associated with the customer. In step 408, server 300 partitions the retrieved dataset 112 into a plurality of frames, each frame being of the same size (i.e., encompassing the same number of rows and columns of the dataset).

Figure 5B:
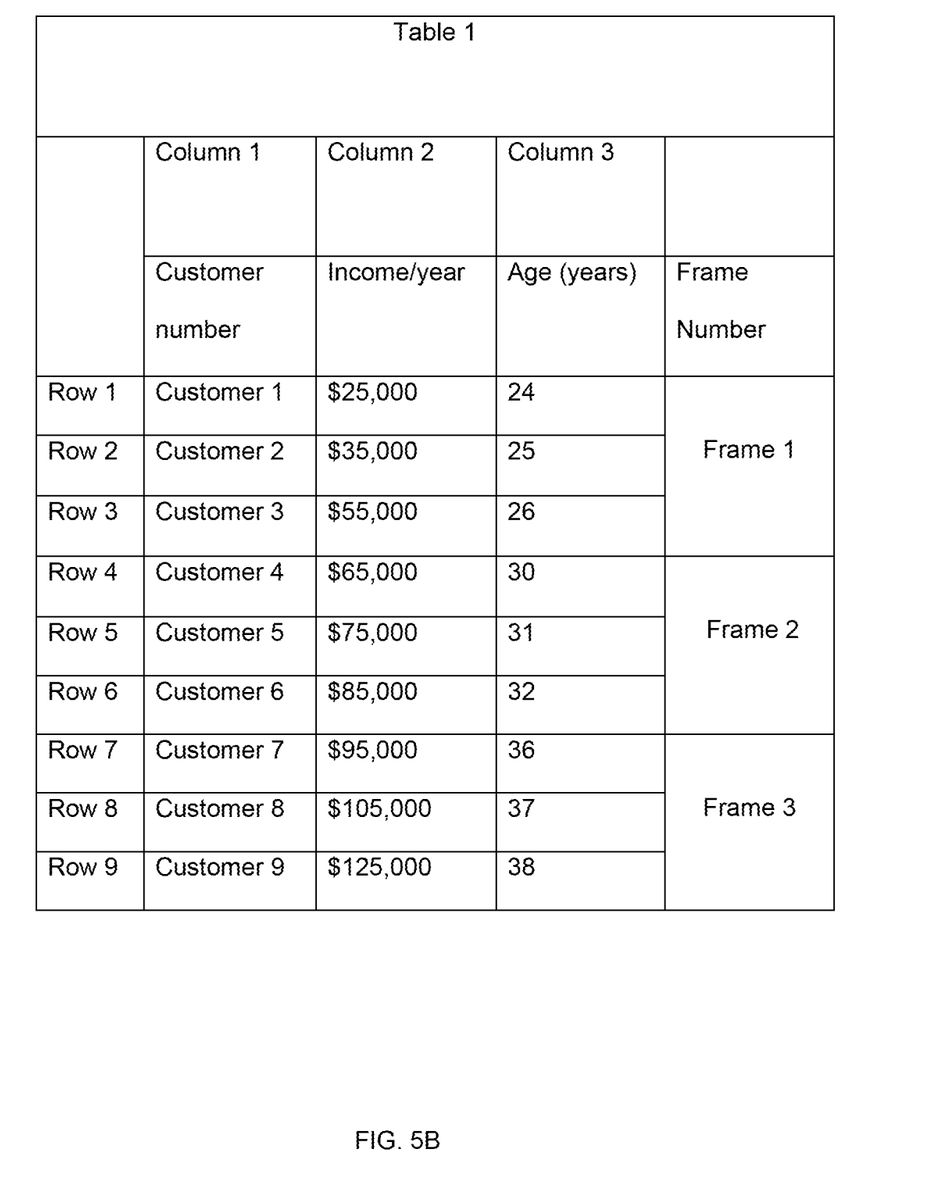

For example, exemplary dataset 112 shown in FIG. 5B is organized into a table having nine rows and three columns divided into two frames. Frames 1-3 together form the plurality of frames, although any number of frames may also be included.

In step 410, the contents of dataset 112 may be transformed into a standardized format. The dataset may include structured data, semi-structured data and/or unstructured data. In this step, the server 300 may determine if the retrieved dataset 112 includes semi-structured data, for example, floating point numbers (e.g., 3.0121, 5.1901, etc.). When the server 300 identifies such floating point numbers, server 300 may, e.g., round them off to the nearest integer, or to a predefined number of decimal places, or to select the maximum value, etc. By way of example, the server may round the floating point numbers 3.0121 and 5.1901 to, e.g., two decimal places (i.e., to 3.00 and 5.11, respectively). Upon standardizing the format, the method then proceeds to step 412.

Figure 5C:
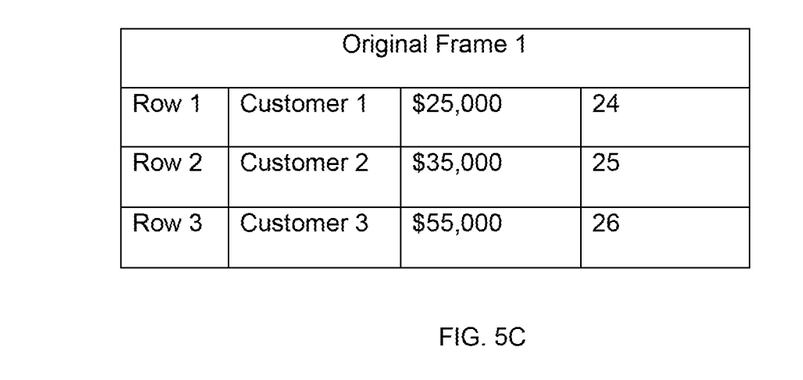

In step 412, server 300 applies an ordered sequence identification model to a first frame, e.g., Frame 1 of FIG. 5C in the dataset of Table 1 to identify an ordered sequence within the columns of the Frame 1. The ordered sequence identification model may include software instructions to identify an ordered sequence from a dataset.

With reference to the FIG. 5C, for example, the server 300 may apply the ordered sequence identification model to a first frame, e.g., Frame 1 (also referred to as Original Frame 1) in Table 1. As shown in FIG. 5C, the Original Frame 1 may include rows 1-3 and corresponding content of columns 1-3. However, any number of rows and columns may be collected together to form a frame. The ordered sequence identification model may proceed to analyze each of the columns 1-3 from the top to the bottom to determine whether the columns include an ordered sequence.

For example, the ordered sequence identification model may include a single convolutional long short-term memory (LSTM) network or a series of single convolutional LSTM networks connected to each other followed by a convolutional layer may be utilized to determine whether the columns include an ordered sequence, although any other algorithm may also be utilized to determine whether rows or columns include an ordered sequence. Upon completion of the analysis of column 1, the ordered sequence identification model may proceed to analyze column 2 et seq. in the same manner as column 1. In the illustrated example, the ordered sequence identification model identifies column 1 as including an ordered sequence because the customer numbers are arranged in a serial order, i.e., "customer 1," "customer 2," and "customer 3." Once all of the columns of the frame have been analyzed, the method may proceed to step 414.

In step 414, the server 300 may determine whether the first frame is an ordered frame, i.e., whether the first frame includes an ordered sequence based on the identification performed in step 412. In some embodiments, a frame is identified as an ordered frame when the frame includes at least one column that is identified as an ordered sequence. For example, when the ordered sequence identification model identifies any one of the columns 1-3 of the Original Frame 1 as including an ordered sequence; then the Original Frame 1 may be identified as a frame including an ordered sequence. In the illustrated example, because column 1 is identified as including an ordered sequence, the Frame 1 is identified as an ordered frame and the method proceeds to step 416. In another example, when the ordered sequence identification model identifies two or more of the columns from the columns 1-3 of the Original Frame 1 as including an ordered sequence, then the Original Frame 1 may be identified as a frame including an ordered sequence.

When, however, the server 300 identifies that none of the columns in the Frame 1 include an ordered sequence, then the server 300 determines whether there is another frame from the plurality of frames in the dataset 112 that need to be processed (step 430). If the server 300 determines that there is another frames in the dataset, then the method loops back to step 412 to identify any ordered sequence in the next frame. When in step 430, server 300 determines that there are no other frames left from the plurality of frames, then the method proceeds to step 432.

Figure 5D:
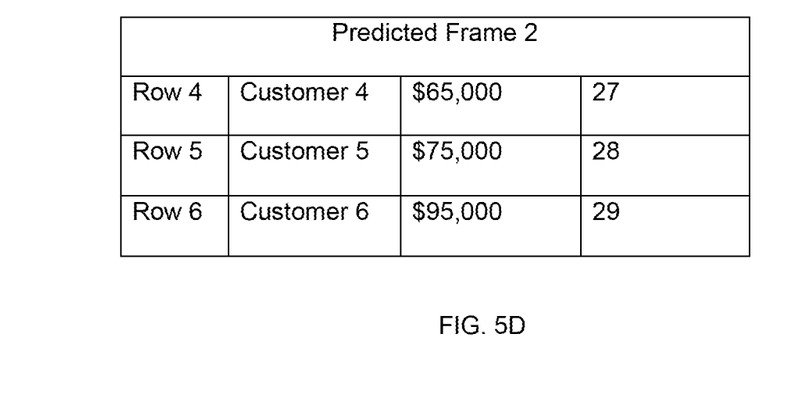

In step 416, server 300 applies a machine learning algorithm to predict contents of the next frame based on the identified ordered sequence of the first frame, e.g., Frame 1. the machine learning algorithm may include a single LSTM network or a series of single convolutional LSTM networks connected to each other followed by a convolutional layer may be utilized to predict contents of the next frame, although any other algorithm may also be utilized to determine contents of the next frame. In the illustrated example, the machine learning algorithm generates a predicted second frame, e.g., Frame 2 as shown by way of example in FIG. 5D based on the identified ordered sequence of Original Frame 1 as shown, by way of example in FIG. 5C.

Figure 5E:
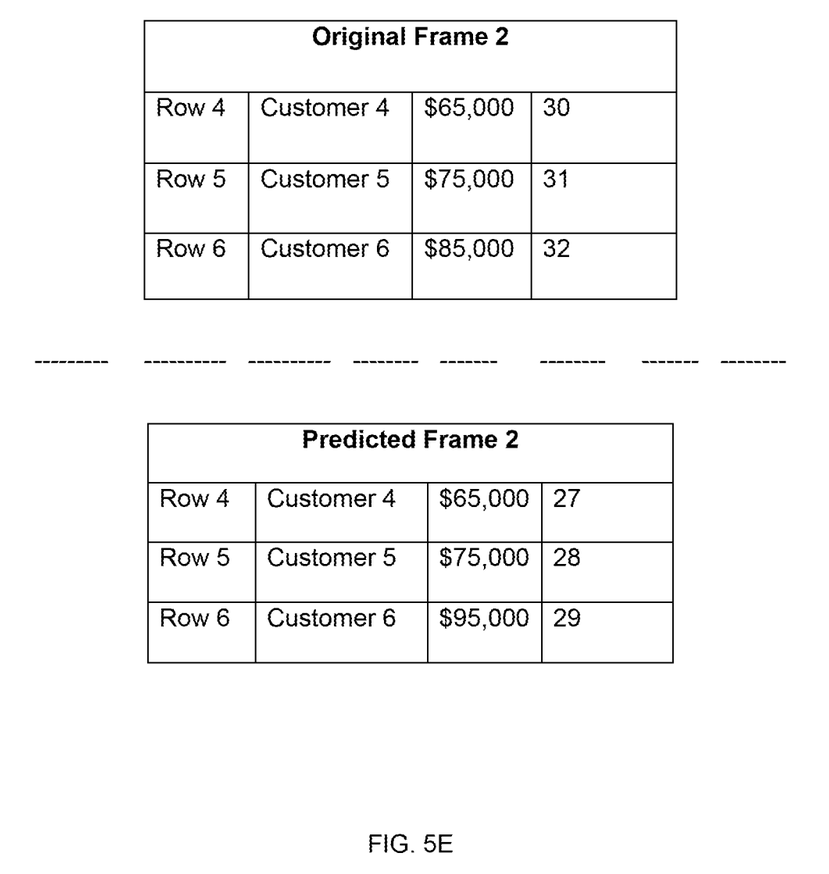

In step 418, server 300 compares the contents of the predicted second frame with the actual contents of the original second frame in the dataset 112. With reference to FIG. 5E, the server 300 utilizes a Levenshtein distance algorithm to perform a comparison between each of cell of the predicted second frame and the corresponding cell of the original second frame in the dataset 112. The Levenshtein distance algorithm is a string metric that may be utilized to identify distance between strings of words or integer numbers.

In step 420, server 300 determines a prediction accuracy value associated with the predicted second frame based on the comparison performed in step 418. Further, based on the distance algorithm applied in the previous step 418, the server 300 may identify how many cells in the predicted Frame 2 have been accurately predicted. In the predicted Frame 2 (FIG. 5E), five out of the nine cells have been predicted accurately, and thus the prediction accuracy value associated with the predicted Frame 2 is 55.55%.

In step 422, the server 300 compares a first prediction threshold value with the prediction accuracy value associated with the predicted Frame 2. The first prediction threshold value in the illustrated example is 51%. However, the first prediction threshold value may be defined by a user. In the illustrated example, the prediction accuracy value associated with the predicted Frame 2 is 55.55%, and therefore exceeds the first prediction threshold value of 51%. Because the prediction accuracy value associated with predicted Frame 2 exceeds the first prediction threshold value, the predicted Frame 2 is identified as satisfying the first prediction threshold value and the method proceeds to step 426.

In step 426, server 300 determines whether the prediction accuracy value exceeds a second prediction threshold value, which may be predefined by the user. The second prediction threshold value in the illustrated example is set at be 96%. In the illustrated example, because the prediction accuracy value associated with the predicted Frame 2 has been determined to be 55.55%, the second prediction threshold value does not exceed the second prediction threshold value. In this scenario, the method proceeds to step 424.

Returning to step 422, if the server 300 determines that the prediction accuracy value does not exceed the first prediction threshold value, the method proceeds to step 424.

In step 424, server 300 provides the predicted Frame 2 to the machine learning algorithm as an input ("back propagation"). In the illustrated example, the predicted Frame 2 had a 55.55% prediction accuracy value and four of the cells from Frame 2 have been inaccurately predicted. For the 4 cells that were predicted inaccurately, the machine learning algorithm identifies that all of the 3 cells from the column 3 and 1 cell on row 6 of column 3 has been inaccurately predicted. The machine learning algorithm is then updated and re-trained using Frames 1 and 2. For example, the machine learning algorithm may utilize the content of rows 1-6 (Frames 1 and 2) to predict the contents of rows 7-9 (Frame 3). The method then proceeds to step 416, where the updated and re-trained machine learning algorithm is applied to predict the contents of the next frame.

Figure 5F:
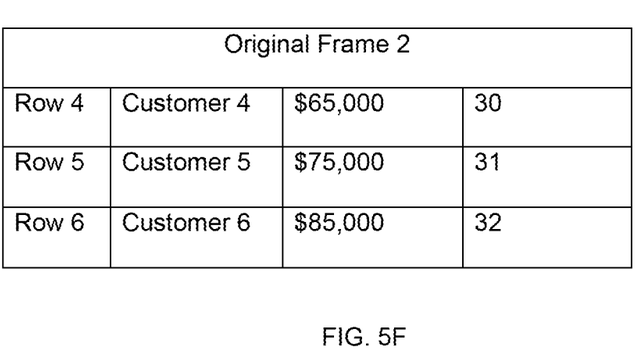
Figure 5G:
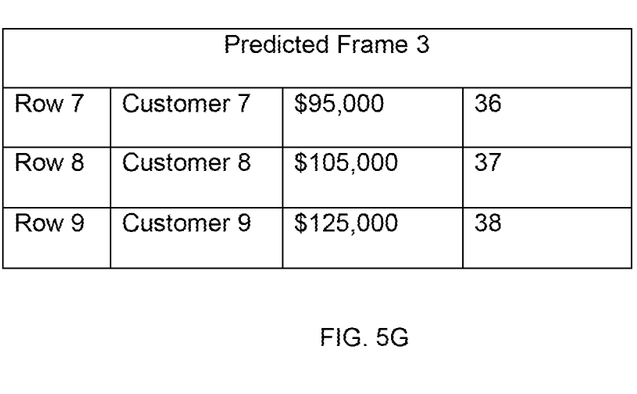
Figure 5H:
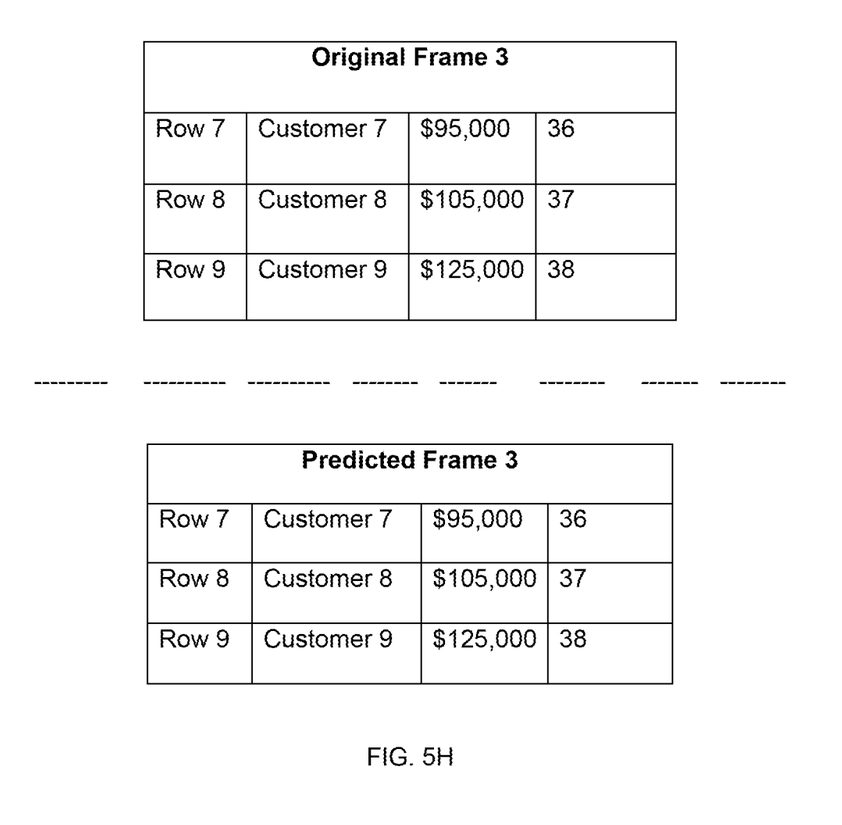

In step 416, server 300 applies the updated and re-trained machine learning algorithm to the Original Frame 2 shown in FIG. 5F to predict the next frame, i.e., the predicted Frame 3 shown in FIG. 5G. Upon applying the updated and re-trained machine learning algorithm to the Original Frame 3, a predicted Frame 3 is generated (FIG. 5H). The method then proceeds to step 418.

In this iteration of step 418, the server 300 compares the contents of predicted Frame 3 with the contents of the Original Frame 3, and then determines the prediction accuracy value associated with the predicted Frame 3 (step 420). In the illustrated example, all nine of the cells of Frame 3 have been predicted accurately and the prediction accuracy value is 100%. At step 422, server 300 determines that the prediction accuracy value of 100% exceeds the first threshold value of 55.55% and the method proceeds to step 426, where it is determined that the prediction accuracy value of 100% exceeds the second prediction threshold value (98%). The method then proceeds to step 428.

In step 428, server 300 flags and stores the predicted Frame 3 in the memory. The stored predicted Frame 3 is then applied as input to the machine learning algorithm to update and re-train the algorithm ("forward propagation") and the method moves to step 430. In step 430, server 300 proceeds to determine if there is another Frame from the plurality of Frames in the dataset 112 that need to be processed. If the server 300 determines that there is another Frames in the dataset, then the method returns to step 412 to identify any ordered sequences in the next frame. When, in step 430, server 300 determines that there are no other frames left from the plurality of frames, the method ends.

In another example, prior to step 416, server 300, may perform the operations of 412 and 414 for n number of frames, e.g., 1000 frames, although any number of frames may be included, before making the first prediction of the next frame in step 416. Upon completing the identification of ordered sequence in the $1000^{th}$ frame in step 414, the machine learning algorithm may begin predicting contents of the $1001^{st}$ frame in step 416.

While illustrative embodiments have been described herein, the scope of the present disclosure includes embodiments having equivalents, modifications, omissions, combinations (e.g., of aspects across various embodiments), adaptations and/or alterations as would be appreciated by those in the art based on the present disclosure. For example, the number and arrangement of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

The invention claimed is:

1. A system for determining an ordered sequence of data in a dataset, the system comprising:
    one or more memory devices storing instructions; and
    one or more processors configured to execute the instructions to perform operations comprising:
        accessing a dataset comprising a plurality of elements arranged in a set of rows and columns;
        partitioning the dataset into a plurality of frames having a first and second frame, each frame of the plurality of frames being of equal size and comprising a subset of the set of rows and columns;
        identifying an ordered sequence of the first frame;
        predicting content of the second frame based on applying a previously trained machine learning algorithm to the ordered sequence of the first frame, wherein the machine learning algorithm includes at least one of decision tree learning, association rule learning, artificial neural networks, inductive logic programming, support vector machines, clustering, Bayesian networking, reinforcement learning, representation learning, similarity and metric learning, spare dictionary learning, or rule-based machine learning;
        comparing the predicted content of the second frame with actual content of the second frame to determine a prediction accuracy value; and
        when the prediction accuracy value of the predicted content does not exceed a first threshold level, re-training the previously trained machine learning algorithm.

2. The system of claim 1, wherein the first and second frames are of equal length.

3. The system of claim 1, wherein the plurality of frames is a sequence of frames, and the second frame is after the first frame in the sequence.

4. The system of claim 1, wherein the operations further comprise: when the prediction accuracy value of the predicted content exceeds the first threshold level, using the predicted content of the second frame to re-train the previously trained machine learning algorithm.

5. The system of claim 1, wherein the operations further comprise: when the prediction accuracy value of the predicted content exceeds the first threshold level, determining whether the prediction accuracy value of the predicted content exceeds a second threshold level.

6. The system of claim 5, wherein the operations further comprise: when the prediction accuracy value of the predicted content exceeds second threshold level, using the predicted content of the second frame to re-train the previously trained machine learning algorithm.

7. The system of claim 1, wherein identifying an ordered sequence of the first frame comprises applying an ordered sequence identification model to the first frame.

8. The system of claim 7, wherein the identified ordered sequence is within a row or column of the dataset.

9. The system of claim 1, wherein predicting content of the second frame comprises using (i) a single long short-term memory (LSTM) network or (ii) a series of long short-term memory (LSTM) networks and a convolutional layer.

10. The system of claim 1, wherein comparing the predicted content of the second frame with actual content of the second frame comprises applying a distance algorithm to cells of the predicted content of the second frame and actual content of the second frame.

11. The system of claim 10, wherein the distance algorithm comprises a Levenshtein distance algorithm.

12. The system of claim 1, the operations further comprising:
    determining contents of the dataset to include unstructured or semi-structured data; and
    standardizing a format of the determined contents.

13. A computer-implemented method for determining an ordered sequence of data in a dataset, comprising:
    accessing a dataset comprising a dataset, the dataset comprising a plurality of elements arranged in a set of rows and columns;
    partitioning the dataset into a plurality of frames having a first and second frame, each frame of the plurality of frames being of equal size and comprising a subset of the set of rows and columns;
    identifying an ordered sequence of the first frame;
    predicting content of the second frame based on applying a previously trained machine learning algorithm to the ordered sequence of the first frame, wherein the machine learning algorithm includes at least one of decision tree learning, association rule learning, artificial neural networks, inductive logic programming, support vector machines, clustering, Bayesian networking, reinforcement learning, representation learning, similarity and metric learning, spare dictionary learning, or rule-based machine learning;
    comparing the predicted content of the second frame with actual content of the second frame to determine a prediction accuracy value; and when the prediction accuracy value of the predicted content does not exceed a first threshold level, re-training the previously trained machine learning algorithm.

14. The computer-implemented method of claim 13, further comprising: when the prediction accuracy value of the predicted content exceeds the first threshold level, using the predicted content of the second frame to re-train the previously trained machine learning algorithm.

15. The computer-implemented method of claim 13, wherein identifying an ordered sequence of the first frame comprises applying an ordered sequence identification model to the first frame.

16. The computer-implemented method of claim 15, wherein the identified ordered sequence is within a row or column of the dataset.

17. The computer-implemented method of claim 13, wherein predicting content of the second frame uses (i) a single long short-term memory (LSTM) network or (ii) a series of long short-term memory (LSTM) networks and a convolutional layer.

18. The computer-implemented method of claim 13, wherein comparing the predicted content of the second frame with actual content of the second frame comprises applying a distance algorithm to cells of the predicted content of the second frame and actual content of the second frame.

19. The computer-implemented method of claim 18, wherein the distance algorithm comprises a Levenshtein distance algorithm.

20. A non-transitory computer-readable medium storing instructions executable by one or more processors to perform operations for determining an ordered sequence of data in a dataset, the operations comprising:
- accessing a dataset comprising a dataset, the dataset comprising a plurality of elements arranged in a set of rows and columns;
- partitioning the dataset into a plurality of frames having a first and second frame, each frame of the plurality of frames being of equal size and comprising a subset of the set of rows and columns;
- identifying an ordered sequence of the first frame;
- predicting content of the second frame based on applying a previously trained machine learning algorithm to the ordered sequence of the first frame, wherein the machine learning algorithm includes at least one of decision tree learning, association rule learning, artificial neural networks, inductive logic programming, support vector machines, clustering, Bayesian networking, reinforcement learning, representation learning, similarity and metric learning, spare dictionary learning, or rule-based machine learning;
- comparing the predicted content of the second frame with actual content of the second frame to determine a prediction accuracy value; and
- when the prediction accuracy value of the predicted content does not exceed a first threshold level, re-training the previously trained machine learning algorithm.

* * * * *